United States Patent

Magaraggia

[11] Patent Number: 6,053,328
[45] Date of Patent: Apr. 25, 2000

[54] BAFFLE FOR REACTORS USED FOR LIQUIDS PURIFICATION

[75] Inventor: Flavio Magaraggia, Vicenza, Italy

[73] Assignee: Comer SpA, Caltrano, Italy

[21] Appl. No.: 09/230,169

[22] PCT Filed: May 27, 1998

[86] PCT No.: PCT/EP98/03120

§ 371 Date: Jan. 21, 1999

§ 102(e) Date: Jan. 21, 1999

[87] PCT Pub. No.: WO98/54403

PCT Pub. Date: Dec. 3, 1998

[30] Foreign Application Priority Data

May 30, 1997 [IT] Italy .................................. VI97A0083

[51] Int. Cl.$^7$ .............. B03D 1/24; B03D 1/16; B03D 1/14

[52] U.S. Cl. .......... 209/170; 209/169; 209/168; 210/194; 210/221.2; 162/4

[58] Field of Search .................................... 209/168, 169, 209/170; 210/221.2, 221.1, 194; 162/4

[56] References Cited

U.S. PATENT DOCUMENTS

| | | |
|---|---|---|
| 2,047,643 | 7/1936 | Mayer . |
| 2,148,445 | 2/1939 | Drake . |
| 2,148,446 | 2/1939 | Drake . |
| 2,274,401 | 2/1942 | Dromgold . |
| 2,626,052 | 1/1953 | Carbonnier . |
| 2,673,724 | 3/1954 | Potts . |
| 2,684,233 | 7/1954 | Payne . |
| 4,431,531 | 2/1984 | Hollingsworth . |
| 5,335,785 | 8/1994 | Kawatra et al. . |
| 5,454,935 | 10/1995 | Magaraggia . |

FOREIGN PATENT DOCUMENTS 634 519   1/1995   European Pat. Off. .

Primary Examiner—Thomas M. Lithgow
Attorney, Agent, or Firm—Watson Cole Grindle Watson P.L.L.C.

[57] ABSTRACT

The invention realizes a baffle for a reactor for liquids purification, said reactor comprising: a tank containing the liquid to be purified; a plurality of injectors suitable for introducing in the tank said liquid to be purified; one or more rotating blades arranged inside said tank, suitable for keeping agitated said liquid to be purified. Said baffle is applied to at least one of said one or more blades and it is formed of a disk supplied with a plurality of through openings suitable for favoring, during the rotation of said blades, the passing of the descending flow of liquid during the purification, and of the ascending flow of aeriform substance dispersed in said liquid, in order to favor the stabilization of the turbulent motion of the liquid itself in correspondence with said blades.

2 Claims, 3 Drawing Sheets

BAFFLE FOR REACTORS USED FOR LIQUIDS PURIFICATION

The invention concerns a baffle suitable for being applied to a reactor for liquids purification, particularly suitable for realising the de-inking of suspensions of recycled paper.

It is known that in the paper working field fittings, which use the flotation in order to realise the de-inking of paper suspensions obtained by recycled paper, are used.

For example, the patent U.S. Pat. No. 4,186,094 which describes a fixture, which comprises a plurality of flotation cells that are arranged in sequence, is known. The liquid to be purified, mixed with air, flows through said cells, inside which the air separates from the liquid in the form of bubbles which capture the impurities and carry them away, realising the purification. The air bubbles loaded with the impurities are pushed away while the purified liquid, which forms what in the technic jargon of the field is indicated with the word "accepted", is sent to the following phases of the process.

The purification system, object of the mentioned patent, but generally all the purification systems belonging to the known technique, present the inconvenience of having a purification efficiency quite low.

In the attempt of improving the purification efficiency, the invention having reference number MI93A001455, on behalf of the same inventor of the present patent, is registered. In said invention a reactor that is essentially formed of a unique tank, in which the liquid to be purified enters the upper part, the purified liquid exits through the bottom and a part of said purified liquid is introduced again in different levels inside the tank, in order to be still further purified, is described. Inside the tank a plurality of rotating blades which, by a vertical shaft with which it is connected, agitates the liquid in order to improve the purification efficiency, is arranged. The present invention sets the purpose of realising a baffle suitable for being applied to a reactor for liquids purification which permits to improve still further the purification efficiency of the reactor, in comparison with the purification efficiencies that are possible to obtain using the reactors belonging to the known technique.

The said purpose is achieved by a baffle suitable for being applied to a reactor for liquids purification, said reactor, according to the main claim, comprising:

a tank suitable for containing the liquid to be purified;

a plurality of injectors suitable for introducing in the tank itself said liquid to be purified with an aeriform substance dispersed in it, in the form of bubbles suitable for capturing the impurities contained in the liquid itself;

one or more blades arranged inside said tank and connected with a rotating shaft, suitable for keeping agitated said liquid to be purified, being said baffle characterised in that it is applied to one or more of said one or more blades and it is formed of a disk, supplied with a plurality of through openings, suitable for favouring, during the rotation of said blades, the passing of the descending flow of liquid during the purification, and of the ascending flow of an aeriform substance dispersed in said liquid, in order to favour the stabilization of the turbulent motion of the liquid itself in correspondence with said blades.

According to a preferred embodiment said disk presents a circular shape which affects almost the whole cross section of the tank.

In said disk, which is preferably with a slight thickness, a plurality of inclined tongues, being each of them obtained during the shearing of the disk itself, is present. In said disk the through openings, which are formed of longitudinal slots through which the descending flow of the purified liquid and the ascending flow of the aeriform substance, containing the removed impurities run, are realised.

Said tongues are inclined in comparison with the surface of the disk with an acute angle substantially similar to the angle of inclination of the resultant which is obtained compounding the ascent speed of the aeriform substance with the rotation speed of the disk itself.

All the tongues and the slots belonging to any one of the four quadrants of 90° in which the disk is divided, are parallel to one another and orthogonal to the corresponding tongues and slots realised in the next squares.

Advantageously the presence of said baffles improves the purification efficiency of the reactor because it stabilizes the flows just in correspondence with each blade, where they are created in order to optimize the removal of the impurities by bubbles of aeriform substance present in the liquid.

The invention is described with reference to the enclosed drawings where:

Figure 1:
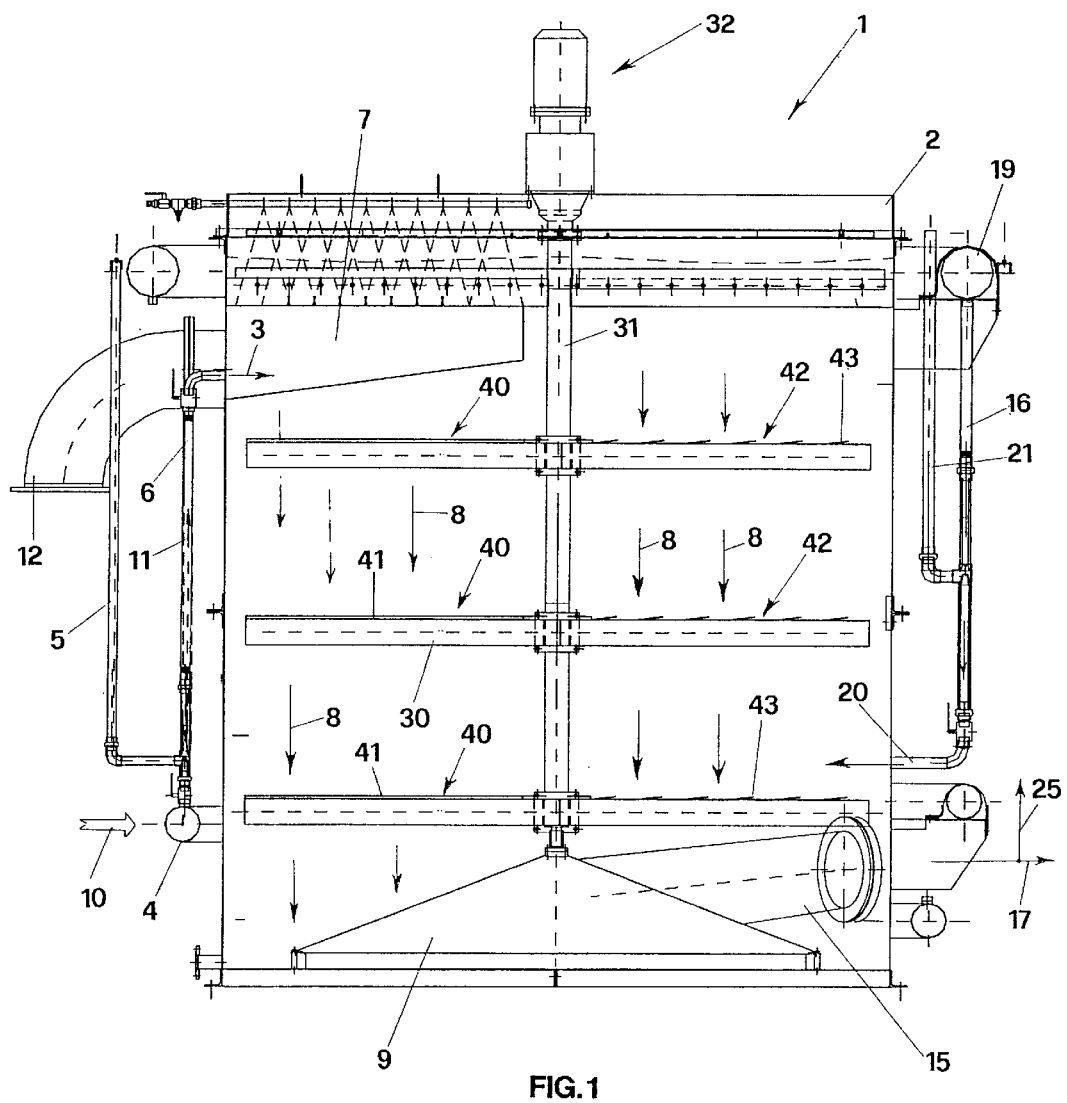
FIG. 1 shows the reactor to which the baffle of the invention, seen in a longitudinal section, is applied.

FIG. 1 shows a reactor, indicated as a whole with 1, that is formed of a cylindrical tank 2, in which a sequence of upper injectors 3, arranged in a circumference, introduces, by a first feeding pipeline 6, the liquid to be purified 10, which arrives from a first feed manifold 4.

A first suction pipeline 5, which by Venturi effect sucks air up from the outside, when the liquid to be purified 10 crosses, with direction 11, said first pipeline 6 which feeds the injectors 3, is arranged in parallel with the first feeding pipeline 6. An emulsion formed of the liquid to be purified mixed with air, where the air bubbles, helped by chemical reagents present in the liquid, capture the impurities present in the liquid itself, is introduced inside the tank 2.

A flotation process which produces a foam that, when arrives on the surface, is removed by a rotating blade 7 which pushes it away by a waste conduct 12, is this way obtained.

The liquid is purified while it gets down, according to the direction 8, and it is received by a suction hood 9 arranged on the bottom of the tank 2 from which it is sucked up by a conduct 15 and by the action of a pump, not represented. A first part of said purified liquid, indicated with 17, is sent to the following phases of the process, and it is considered the "accepted" part, while a second one 25 of the liquid itself is sent to a second manifold 19 which, on its turn, conveys it by a second feeding pipeline 16 towards the intermediate atomizers 20 in a varying number, as required, being one of them represented in FIG. 1.

Before said second inlet, the liquid is again mixed with air which is sucked up by Venturi effect from a second suction pipeline 21 which communicates with the atmosphere, and it is arranged in parallel with said second feeding pipeline 16.

This way a second flotation which purifies further the liquid, is obtained. It can be observed that a plurality of blades 30 which, by a vertical shaft 31, connected with a ratiomotor group 32, is set in rotation, creating a turbulence in the liquid, is arranged inside the tank 2.

The surface of said blades is realised with a porous material and therefore each of them is substantially a reactor which makes the intimate exchange in between the air bubbles and the liquid to be purified, making easy the capture of the pollutants present in the liquid by the air bubbles.

Figure 2:
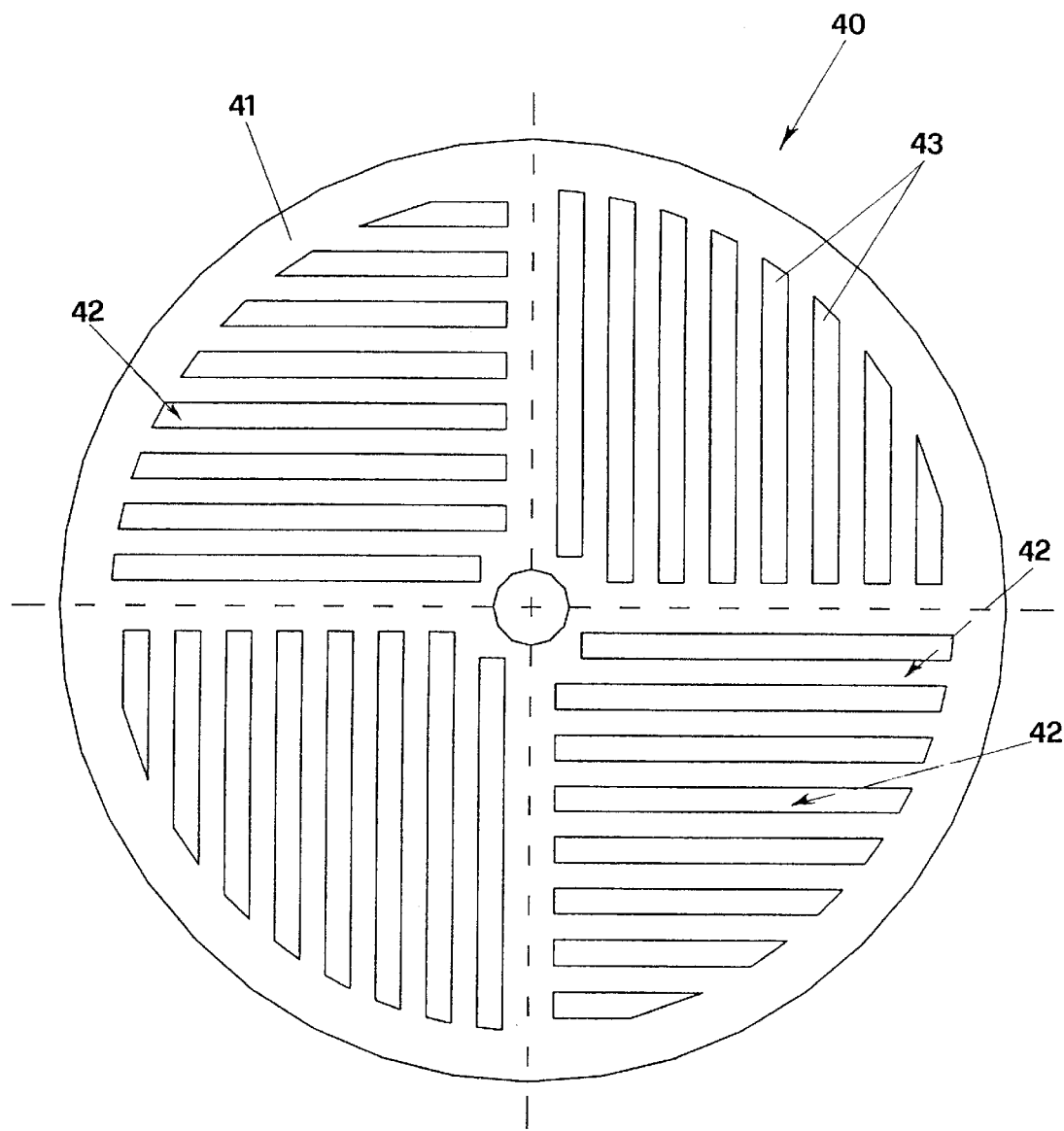
FIG. 2 shows in a top view the baffle of the invention which is applied to the blades that equip the reactor represented in FIG. 1.
Figure 4:
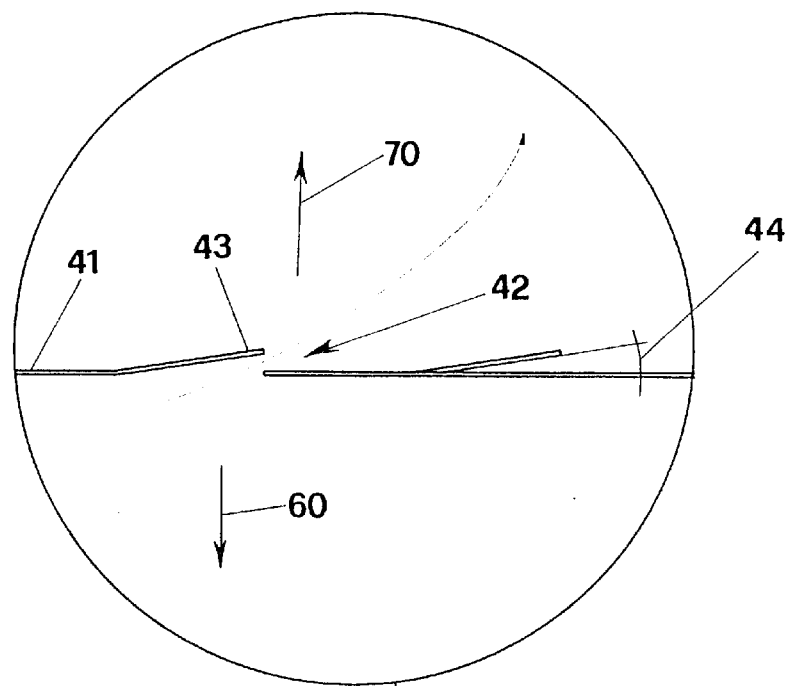
FIG. 4 shows an enlarged particular of the section of the baffle represented in FIG. 3.
Figure 3:
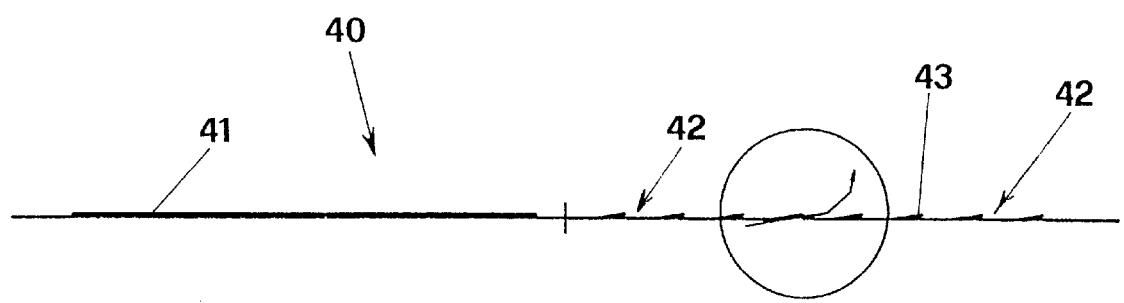
FIG. 3 shows the cross section of the baffle of FIG. 2.

The baffle of the invention, indicated as a whole with 40 and represented in a plan view in FIG. 2, is applied, on each blade 30, in order to stabilize the turbulent flows which are created. Said baffle, as it can be observed, is formed of a disk 4 on which surface, as FIG. 4 in particular shows, a plurality of openings 42 is realised.

In particular said openings are obtained opening by shearing in the disk 41 a plurality of longitudinal slots 42, and bending again a part of the sheared material in order to realise a plurality of tongues 43, being each of them inclined upwards with an angle 44. Such angle of inclination is substantially corresponding with the angle, according to which, the resultant speed, which is obtained compounding the ascent speed of the aeriform substance dispersed in the liquid to be purified with the rotation speed of the disk 41 itself, is inclined.

This way the stabilization of the flow of the descending liquid, according to the direction 60, and of the ascending air bubbles containing the impurities captured by the liquid, according to the direction 70, is obtained through the slots 42.

Besides, it can be observed that said slots 42 are realised in all the four quadrants of 90°, according to which the disk 41 is divided, and besides, the slots 42 belonging to a quadrant are parallel to one another and orthogonal to the slots 42 belonging to the next quadrants and this in order to obtain an improvement of the purification efficiency.

The presence of the baffle 40, realised according to the described form, permits, therefore, to improve in a considerable way the purification efficiency in comparison with the reactor described in the already mentioned patent, having reference number MI93A001455 and, first of all, in comparison with reactors of different kind which are present on the market. It is clear that the baffle could be applied to reactors or to machines for liquids purification of every kind, different from the described reactors, provided that they are supplied with any rotating blades for the agitation of the liquid to be purified. The baffle couldn't also be applied to all the rotating blades of the reactor.

Besides, the baffle could be realised with shapes and outlines different from those described, however considering said variants all protected by the present invention.

I claim:

1. A flotation reactor for the purification of liquids comprising:
    a flotation tank for containing the liquid to be purified;
    a plurality of injectors for introducing in said tank said liquid to be purified with an aeriform substance dispersed in the liquid in the form of bubbles for capturing impurities contained in the liquid;
    a rotable shaft located within the tank;
    at least one blade arranged inside said tank and connected with the rotatable shaft, for agitating said liquid to be purified, a baffle mounted for rotation to each blade formed of a disk having a plurality of through openings in the form of slots with each slot being delimited by an upwardly inclined tongue extending from the plane of the disk, for allowing during the rotation of each said baffle and blade, the passing of a descending flow of liquid during purification, and for allowing the ascending flow of the aeriform substance dispersed in said liquid, in order to stabilize turbulent motion of said liquid in correspondence with said blades.

2. A reactor according to the claim 1 wherein said slots and said tongues are formed in four quadrants of 90° of said disk, said slots and said tongues, in anyone of said quadrants being parallel to one another and orthogonal to the slots and the tongues in any of the adjacent quadrants.

* * * * *